(12) United States Patent
Kaneko et al.

(10) Patent No.: US 11,597,454 B2
(45) Date of Patent: Mar. 7, 2023

(54) VEHICLE

(71) Applicant: Toyota Jidosha Kabushiki Kaisha, Toyota (JP)

(72) Inventors: Yusuke Kaneko, Nagoya (JP); Masato Endo, Nagakute (JP); Shinji Sassa, Ama (JP); Takahiro Shiga, Chiryu (JP); Yohei Tanigawa, Toyota (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 1073 days.

(21) Appl. No.: 16/262,026

(22) Filed: Jan. 30, 2019

(65) Prior Publication Data

US 2019/0232849 A1 Aug. 1, 2019

(30) Foreign Application Priority Data

Jan. 31, 2018 (JP) .............................. JP2018-014925

(51) Int. Cl.
| | |
|---|---|
| *B62D 53/04* | (2006.01) |
| *B62D 33/04* | (2006.01) |
| *B60P 1/00* | (2006.01) |
| *B62D 53/00* | (2006.01) |
| *B60P 3/40* | (2006.01) |
| *B62D 53/02* | (2006.01) |
| *B60P 1/02* | (2006.01) |

(52) U.S. Cl.
CPC .............. *B62D 53/04* (2013.01); *B60P 1/003* (2013.01); *B60P 3/40* (2013.01); *B62D 33/04* (2013.01); *B62D 53/00* (2013.01); *B62D 53/021* (2013.01); *B60P 1/025* (2013.01)

(58) Field of Classification Search
CPC . B60P 3/007; B60P 3/40; B62D 33/04; B62D 53/00; B62D 53/005; B62D 53/02; B62D 53/021; B62D 53/04
USPC ...................................... 280/400, 408, 411.1
See application file for complete search history.

(56) References Cited

U.S. PATENT DOCUMENTS

| | | | |
|---|---|---|---|
| 2,562,504 A | 7/1951 | Metzger | |
| 8,882,131 B2 * | 11/2014 | McFarlane | ........... B62D 53/045 280/411.1 |
| 10,538,190 B1 * | 1/2020 | Metellus | ................... B60F 5/02 |
| 10,934,093 B2 * | 3/2021 | Gil | ........................ B60P 1/4471 |
| 2004/0188433 A1 | 9/2004 | Morales et al. | |

(Continued)

FOREIGN PATENT DOCUMENTS

| | | |
|---|---|---|
| CN | 106379346 A | 2/2017 |
| JP | 63-094312 A | 4/1988 |

(Continued)

*Primary Examiner* — Jason S Daniels
(74) *Attorney, Agent, or Firm* — Dinsmore & Shohl LLP

(57) ABSTRACT

A vehicle for transporting cargo includes a front end unit having a front wheel, a rear end unit having a rear wheel, and a carrying unit on which the cargo is loaded and which is interposed between the front end unit and the rear end unit so that the front end unit and the rear end unit are coupled to each other via the carrying unit. The carrying unit is configured to be separated from the front end unit and the rear end unit in a direction intersecting a direction in which the vehicle travels and to be coupled to the front end unit and the rear end unit while the front end unit and the rear end unit are stationary.

5 Claims, 13 Drawing Sheets

(56) References Cited

U.S. PATENT DOCUMENTS

| | | | | |
|---|---|---|---|---|
| 2007/0296180 | A1* | 12/2007 | Scharf | B60D 5/00 |
| | | | | 280/408 |
| 2009/0285661 | A1 | 11/2009 | Nespor | |
| 2013/0234413 | A1* | 9/2013 | Sutton | B60G 11/265 |
| | | | | 280/400 |
| 2013/0341105 | A1* | 12/2013 | Hukkanen | B62D 53/023 |
| | | | | 180/14.1 |
| 2015/0006005 | A1* | 1/2015 | Yu | G06Q 50/28 |
| | | | | 701/22 |
| 2015/0042066 | A1* | 2/2015 | Nooren | B60P 3/40 |
| | | | | 280/400 |
| 2015/0367885 | A1* | 12/2015 | Bruns | B62D 53/005 |
| | | | | 280/408 |
| 2019/0385461 | A1* | 12/2019 | Blomstrand | B62D 53/0864 |

FOREIGN PATENT DOCUMENTS

| | | |
|---|---|---|
| JP | H11-323804 A | 11/1999 |
| JP | 2002-104062 A | 4/2002 |
| JP | 2002-127808 A | 5/2002 |
| JP | 2006-131044 A | 5/2006 |
| JP | 2016-199158 A | 12/2016 |
| JP | 2016-218736 A | 12/2016 |
| WO | WO-2019083502 A1 * | 5/2019 ............. A47B 45/00 |

\* cited by examiner

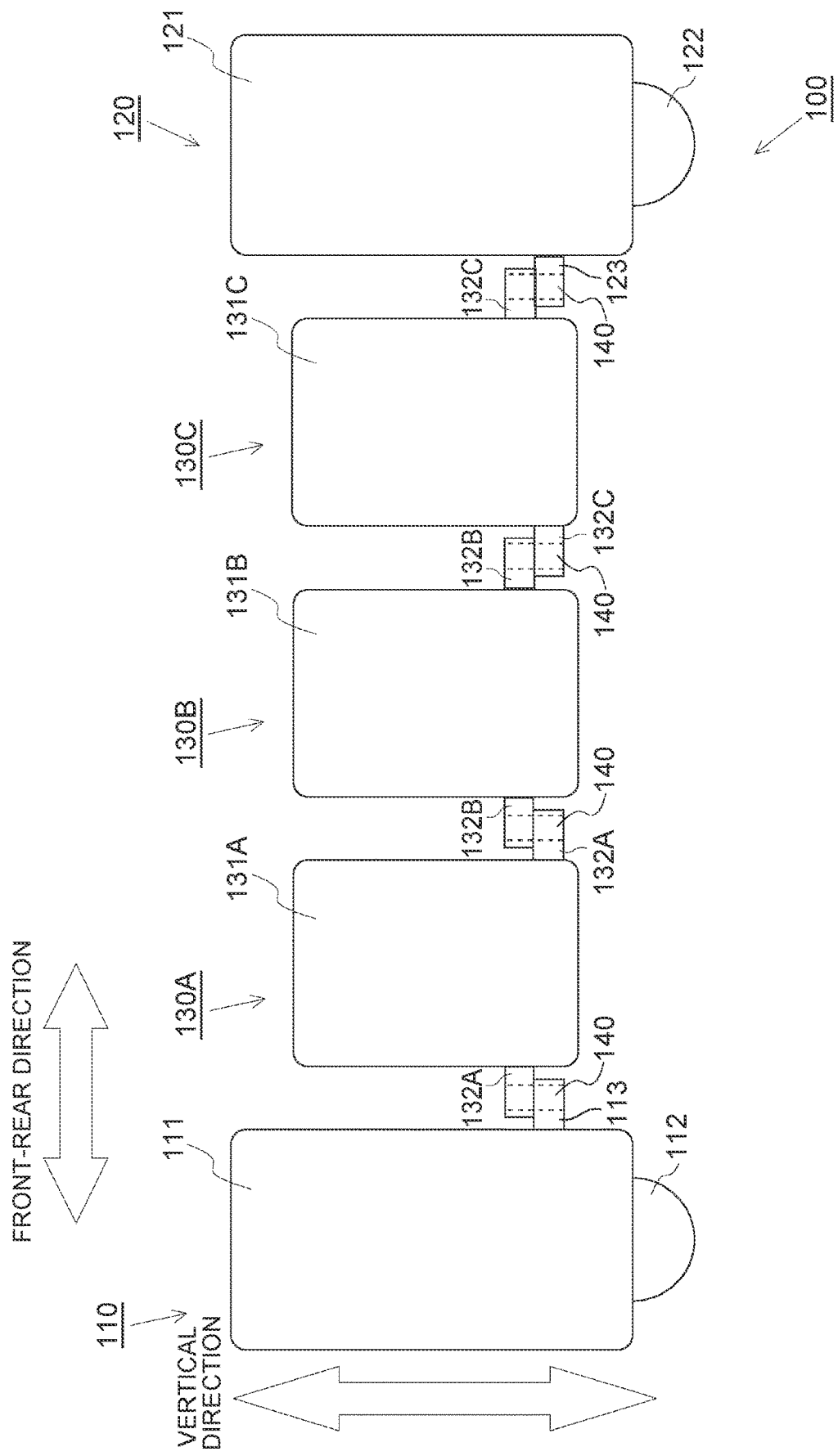

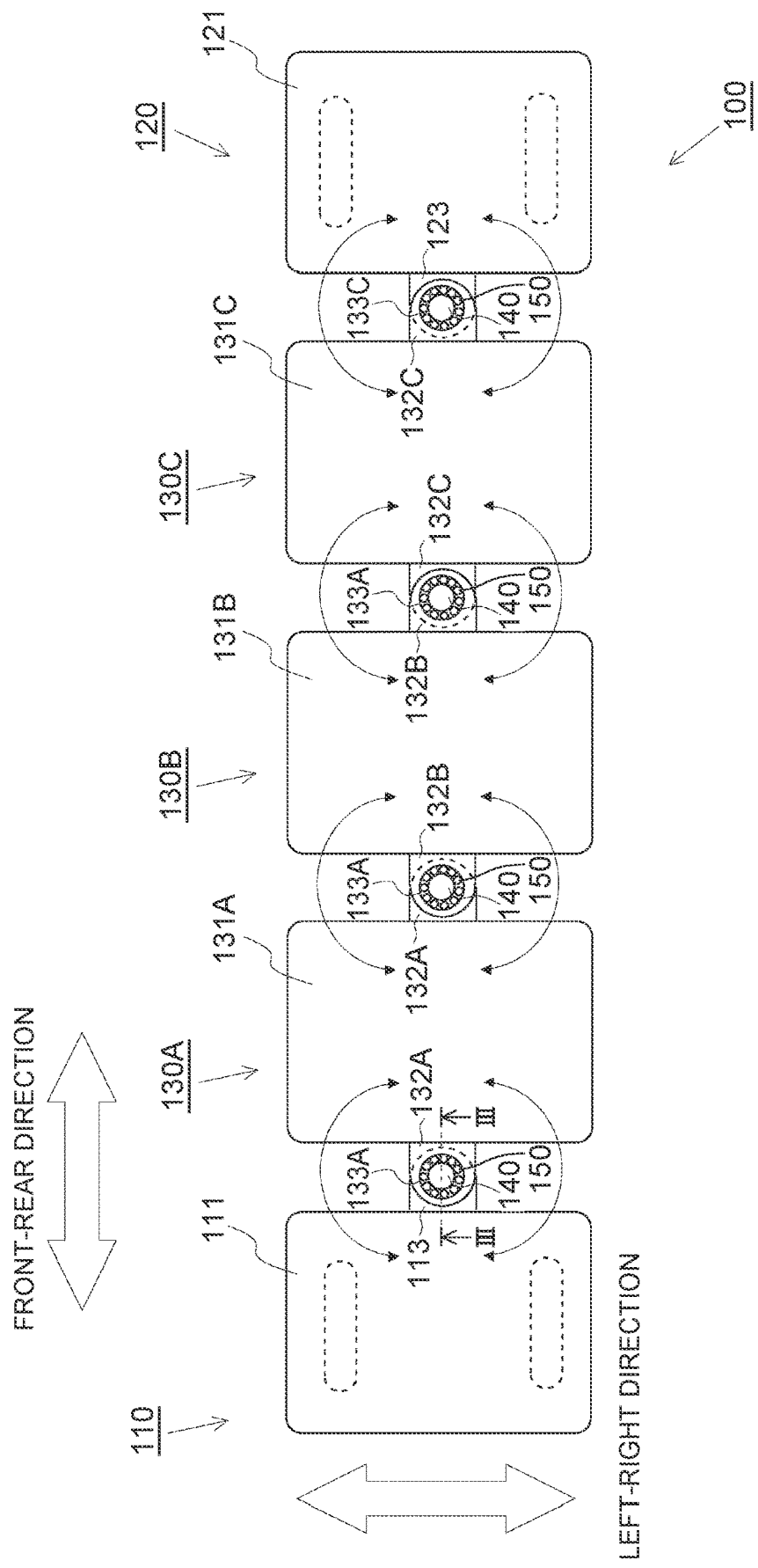

VEHICLE

INCORPORATION BY REFERENCE

The disclosure of Japanese Patent Application No. 2018-014925 filed on Jan. 31, 2018 including the specification, drawings and abstract is incorporated herein by reference in its entirety.

BACKGROUND

1. Technical Field

The disclosure relates to a vehicle for transporting cargo.

2. Description of Related Art

Automated guided vehicles for transferring containers and the like have been developed so far. For example, Japanese Unexamined Patent Application Publication No. 2016-218736 (JP 2016-218736 A) describes an automated guided vehicle for a container, which autonomously runs on a travel route provided with a straight line.

Japanese Unexamined Patent Application Publication No. 11-323804 (JP 11-323804 A) describes a technology in which driverless autonomous vehicles travel on the prescribed roads while carrying trucks or towing trailers.

SUMMARY

In recent years, delivery systems in which cargo is collected and delivered using automated driving vehicles and the like have been developed. However, in such delivery systems, cargo needs to be unloaded and reloaded at a distribution center etc. as previously. Therefore, it is desired to provide a vehicle that facilitates unloading and reloading of the cargo.

The disclosure provides a technology related to a vehicle that facilitates unloading and reloading of cargo.

An aspect of the disclosure relates to a vehicle for transporting cargo. The vehicle includes a front end unit having a front wheel, a rear end unit having a rear wheel, and a carrying unit on which the cargo is loaded and which is interposed between the front end unit and the rear end unit so that the front end unit and the rear end unit are coupled to each other via the carrying unit. The carrying unit is configured to be separated from the front end unit and the rear end unit in a direction intersecting a direction in which the vehicle travels and to be coupled to the front end unit and the rear end unit while the front end unit and the rear end unit are stationary.

In the vehicle as described above, the cargo is loaded on the carrying unit. Thus, the cargo on the vehicle is unloaded and reloaded through exchange of the carrying unit. The unloading and reloading of the cargo are performed at a distribution center, for example.

The vehicle can be disassembled by separating the carrying unit from the front end unit and the rear end unit. The carrying unit can be separated from the front end unit and the rear end unit in the direction intersecting the direction in which the vehicle travels, while the front end unit and the rear end unit are stationary. This provides a relatively high degree of flexibility in disassembly of the vehicle. On the other hand, the vehicle can be assembled by arranging the carrying unit between the front end unit and the rear end unit while the front end unit and the rear end unit are stationary. Thus, even when the vehicle is disassembled as described above, it is possible to reassemble the vehicle relatively easily. That is, disassembly and reassembly of the vehicle can be carried out relatively easily through separation and coupling of the carrying unit.

With the vehicle described above, the carrying unit loaded with the cargo is easily exchanged, whereby the cargo can be easily unloaded and reloaded.

The vehicle may include a plurality of the carrying units. The carrying units may be configured to be separated from each other in the direction intersecting the direction in which the vehicle travels and to be coupled to each other with the front end unit and the rear end unit being stationary. With this configuration, multiple items of cargo bound for the same area can be easily gathered to be loaded onto the vehicle. For example, when the items of cargo are collected using the vehicles described above, each item of cargo is loaded on a specified carrying unit in accordance with the destination of the cargo. Thus, the items of cargo bound for the same area can be gathered to be loaded onto the vehicle only through the exchange of the carrying units, when the collected cargo is delivered to the destination.

Another aspect of the disclosure relates to a vehicle for transporting cargo. The vehicle includes a floor provided with a vehicle wheel, a roof provided so as to face the floor, a side wall provided between the floor and the roof, in which the floor, the roof, and the side wall define a space in which the cargo is loaded. The vehicle also includes an opening and closing portion that is provided in each of the floor, the roof, and the side wall, and that allows access to the cargo.

In the vehicle as described above, when the space in which the cargo is loaded is defined by a structure having a hexahedron shape, the opening and closing portion can be provided in all the six faces of the structure. Accordingly, a cargo that is difficult to take out from one side can be taken out from another side. That is, the cargo can be unloaded and reloaded relatively easily.

The opening and closing portion provided in the floor may slide substantially in parallel with the floor so as to partially open and close the floor.

The vehicle described above may be an autonomous mobile body that autonomously moves based on a prescribed operation command. The operation command is information including information on a destination and a travel route, information on a service provided on a route, and the like. This makes it possible to promote automatization of delivery.

According to the disclosure, cargo loaded on a vehicle can be unloaded and reloaded relatively easily.

BRIEF DESCRIPTION OF THE DRAWINGS

Features, advantages, and technical and industrial significance of exemplary embodiments of the disclosure will be described below with reference to the accompanying drawings, in which like numerals denote like elements, and wherein:

FIG. 1 is a schematic view of a vehicle according to a first embodiment;

FIG. 2 is a plan view of the vehicle illustrated in FIG. 1;

DETAILED DESCRIPTION OF EMBODIMENTS

First Embodiment

Outline of Vehicle

Figure 3A:
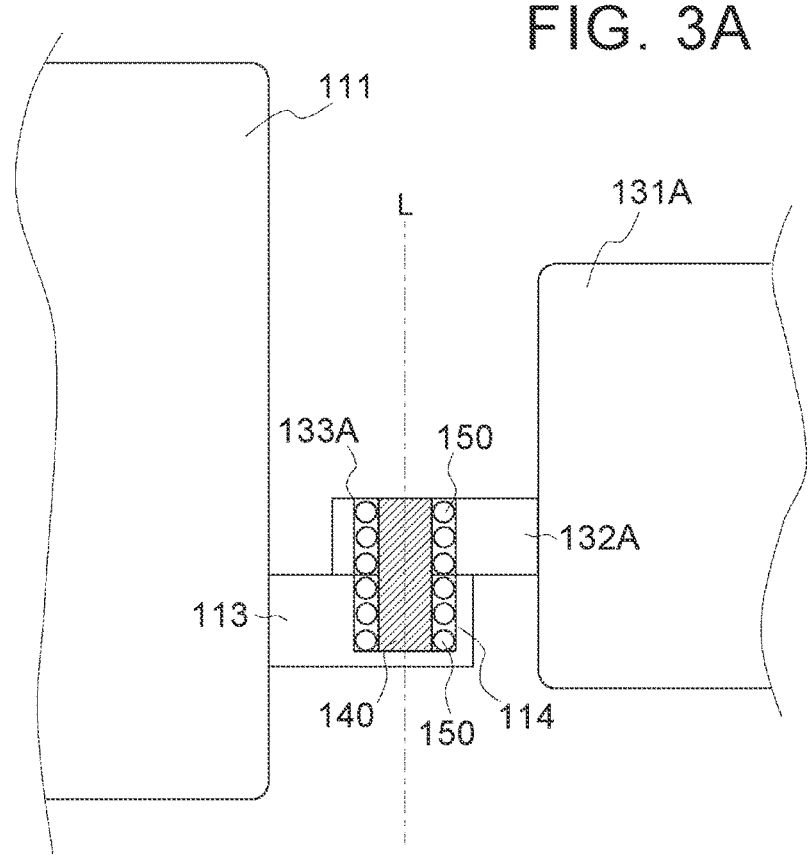
FIG. 3A is a sectional view taken along line III-III in FIG. 2.

An outline of a vehicle according to a first embodiment will be described with reference to FIGS. 1 to 3C. A vehicle 100 according to the first embodiment includes a front end unit 110, a rear end unit 120, a plurality of carrying units 130A, 130B, . . . , 130n. When the carrying units 130A, 130B, . . . , 130n are not individually mentioned, the carrying units 130A, 130B, . . . , 130n are collectively referred to as carrying units. The vehicle 100 can perform autonomous driving and unmanned driving on the road. Cargo is loaded on the carrying units so that the vehicle 100 transports the cargo.

As illustrated in FIG. 1, the front end unit 110 has a vehicle body 111, vehicle wheels 112, and a coupling portion 113. The front end unit 110 is coupled to the rear end unit 120 via the carrying units to form the vehicle 100 as will be described later. The vehicle wheels 112 function as front wheels of the vehicle 100. The rear end unit 120 has a vehicle body 121, vehicle wheels 122, and a coupling portion 123. The vehicle wheels 122 function as rear wheels of the vehicle 100 in which the front end unit 110 and the rear end unit 120 are coupled to each other.

As illustrated in FIG. 1, the carrying units 130A, 130B, and 130C have containers 131A, 131B, and 131C, and coupling portions 132A, 132B, and 132C, respectively. When the containers 131A, 131B, and 131C are not individually mentioned, the containers 131A, 131B, and 131C are collectively referred to as containers. When the coupling portions 132A, 132B, and 132C are not individually mentioned, the coupling portions 132A, 132B, and 132C are collectively referred to as coupling portions. The carrying units are interposed between the front end unit 110 and the rear end unit 120, so that the front end unit 110 and the rear end unit 120 are coupled to each other via the carrying units. In the vehicle 100 illustrated in FIG. 1, the carrying units do not have vehicle wheels. However, the disclosure is not limited to this configuration. The carrying units may have vehicle wheels. When the carrying units have vehicle wheels, the vehicle wheels of each carrying unit are disposed so as to be rotatable around the shaft such that the carrying units can be moved in a direction intersecting a direction in which the vehicle 100 travels (this will be detailed later).

Hereinafter, coupling between the front end unit 110 and the carrying unit, coupling between the rear end unit 120 and the carrying unit, and coupling between the carrying units will be explained, using as an example a mode of coupling between the front end unit 110 and the carrying unit 130A. As illustrated in FIG. 1, the coupling portion 113 of the front end unit 110 and one of the coupling portions 132A of the carrying unit 130A are placed on each other in the vertical direction. Then, a coupling pin 140 is inserted in respective pin holes of the coupling portions 113 and 132A so that the front end unit 110 and the carrying unit 130A are coupled to each other. This will be detailed hereinafter based on FIGS. 2 and 3A.

FIG. 2 is a plan view of the vehicle 100 illustrated in FIG. 1. As illustrated in FIG. 2, a bearing 150 is press-fitted in each pin hole of the coupling portions (for example, a pin hole of the coupling portion 132A is referred to as a hole 133A). Specifically, as illustrated in FIG. 3A that is a sectional view taken along line III-III in FIG. 2, an outer ring of the bearing 150 is press-fitted in each of the hole 133A of the coupling portion 132A and a hole 114 of the coupling portion 113. The coupling pin 140 (hatched in FIG. 3A) is lightly press-fitted in an inner ring of each bearing 150 so that the coupling portion 113 and the coupling portion 132A are coupled to each other. Thus, the front end unit 110 and the carrying unit 130A are coupled to each other. Modes of coupling between the rear end unit 120 and the carrying unit and coupling between the carrying units are the same as the above.

When the front end unit 110 and the rear end unit 120 are coupled via the carrying units as described above, each carrying unit can pivot about a center axis of the coupling pin 140 (indicated by line L in FIG. 3A). This makes the minimum turning radius of the vehicle 100 as small as possible. In the first embodiment, the front end unit 110 and the rear end unit 120 are autonomous vehicles that can perform autonomous driving as described later. Thus, individual steering angles and individual driving torques of the front wheels of the front end unit 110 and the rear wheels of the rear end unit 120 are independently controlled so that the traveling position of the vehicle 100 is controlled.

Figure 3B:
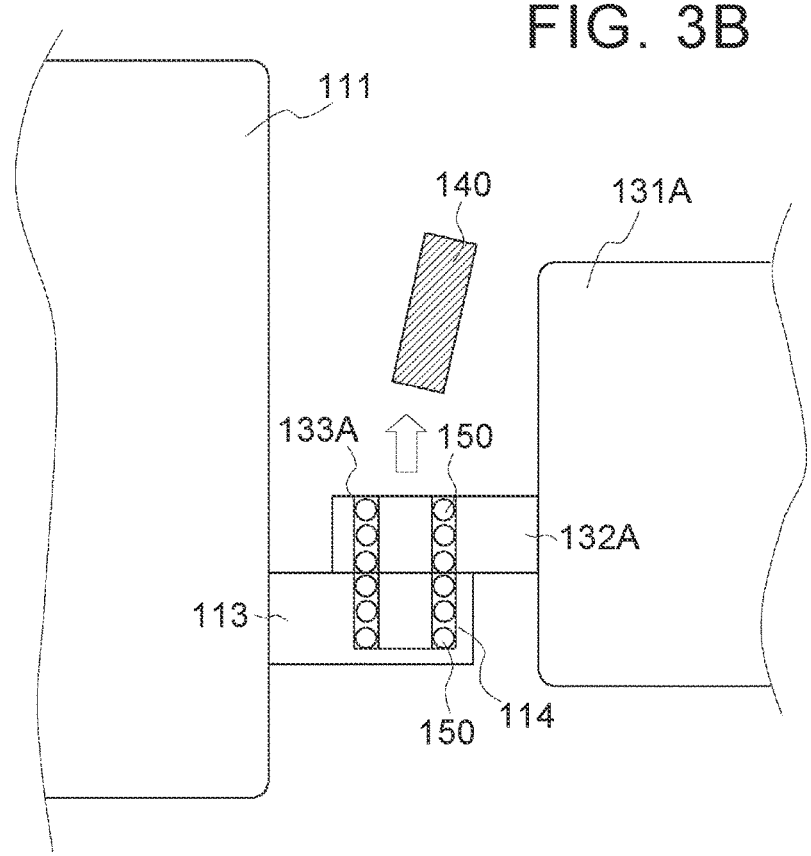
FIG. 3B is a first diagram for explaining a mode of separating a carrying unit from a front end unit.
Figure 3C:
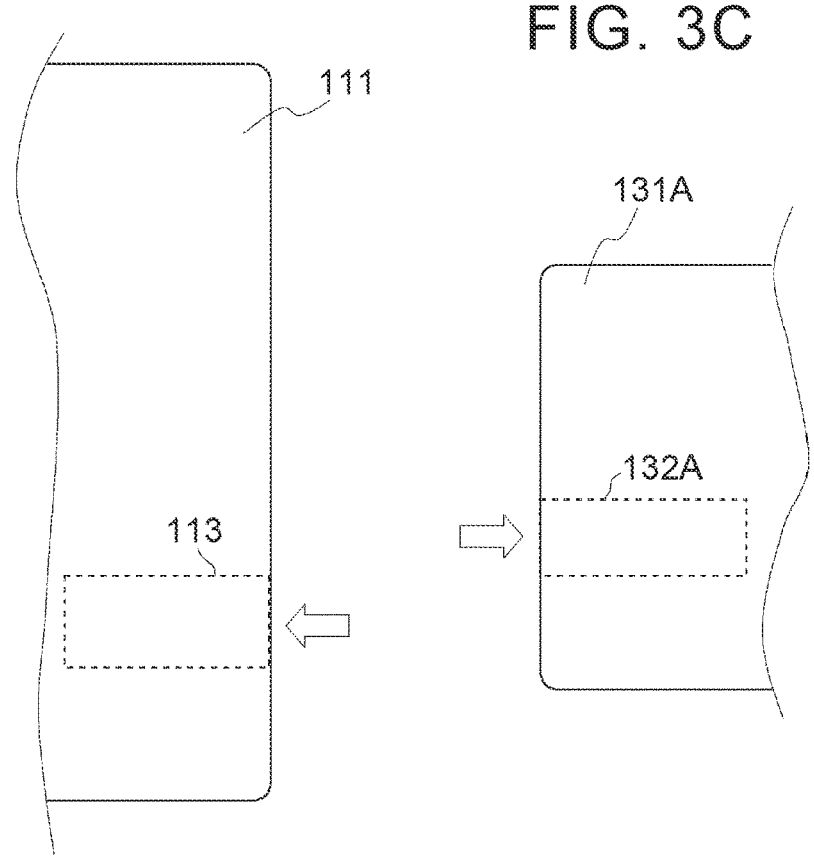
FIG. 3C is a second diagram for explaining the mode of separating the carrying unit from the front end unit.

The vehicle 100 can be disassembled as the carrying units are separated from the front end unit 110 and the rear end unit 120. This will be explained hereinafter based on FIGS. 3B and 3C. Coupling of the carrying units (coupling between the front end unit 110 and the carrying unit, coupling between the rear end unit 120 and the carrying unit, coupling between the carrying units) is released when the coupling pin 140 is removed as illustrated in FIG. 3B. The coupling portions 113 and 123 of the front end unit 110 and the rear end unit 120 are stowable in the vehicle bodies 111 and 121, respectively. The coupling portions of each carrying unit are stowable in the container. Thus, when the coupling portions are stowed after the removal of the coupling pin 140 as shown in FIG. 3C, the carrying unit can be separated in the direction intersecting the direction in which the vehicle 100 travels (lateral direction, vertical direction, etc.). That is, the carrying unit can be separated from the front end unit 110 and the rear end unit 120 in the direction intersecting the direction in which the vehicle 100 travels, while the front end unit 110 and the rear end unit 120 are stationary.

When the vehicle 100 that has been disassembled as described above is reassembled, the coupling portions are placed on each other in the vertical direction and the coupling portions are coupled to each other with the coupling pin 140. Thus, the vehicle 100 can be assembled relatively easily. That is, the disassembly and reassembly of the vehicle 100 can be carried out relatively easily by separation and coupling of the carrying units from and to the vehicle 100.

Figure 4A:
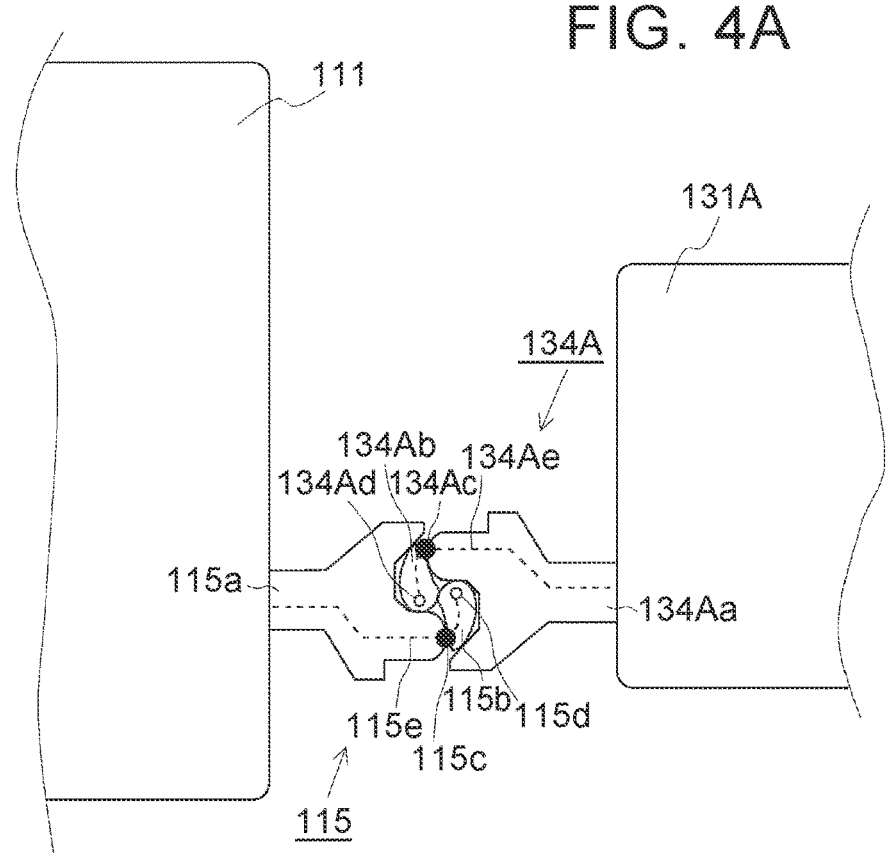
FIG. 4A is a diagram illustrating a mode of coupling of the carrying unit to the front end unit via coupling hooks.

The first embodiment is not intended to limit the mode of coupling of the carrying units to the mode described above. FIG. 4A is a diagram illustrating a mode of coupling of the carrying unit via coupling hooks. The mode of coupling via the coupling hooks will be explained hereinafter, using a mode of coupling between the front end unit 110 and the carrying unit 130A as an example.

As illustrated in FIG. 4A, the front end unit 110 has a coupling hook 115. The coupling hook 115 includes a base 115a, knuckle 115b, a pivot 115c, a working portion 115d, and a wire 115e. The carrying unit 130A has a coupling hook 134A. The coupling hook 134A includes a base 134Aa, a knuckle 134Ab, a pivot 134Ac, a working portion 134Ad, and a wire 134Ae.

While the front end unit 110 and the carrying unit 130A are coupled to each other, the knuckle 115b of the coupling hook 115 and the knuckle 134Ab of the coupling hook 134A are engaged with each other as illustrated in FIG. 4A. The knuckles 115b and 134Ab are pivotable about the pivots 115c and 134Ac, respectively. The wires 115e and 134Ae are connected to the working portions 115d and 134Ad, respectively. The knuckles 115b and 134Ab pivot with the operation of the wires 115e and 134Ae, respectively.

Figure 4B:
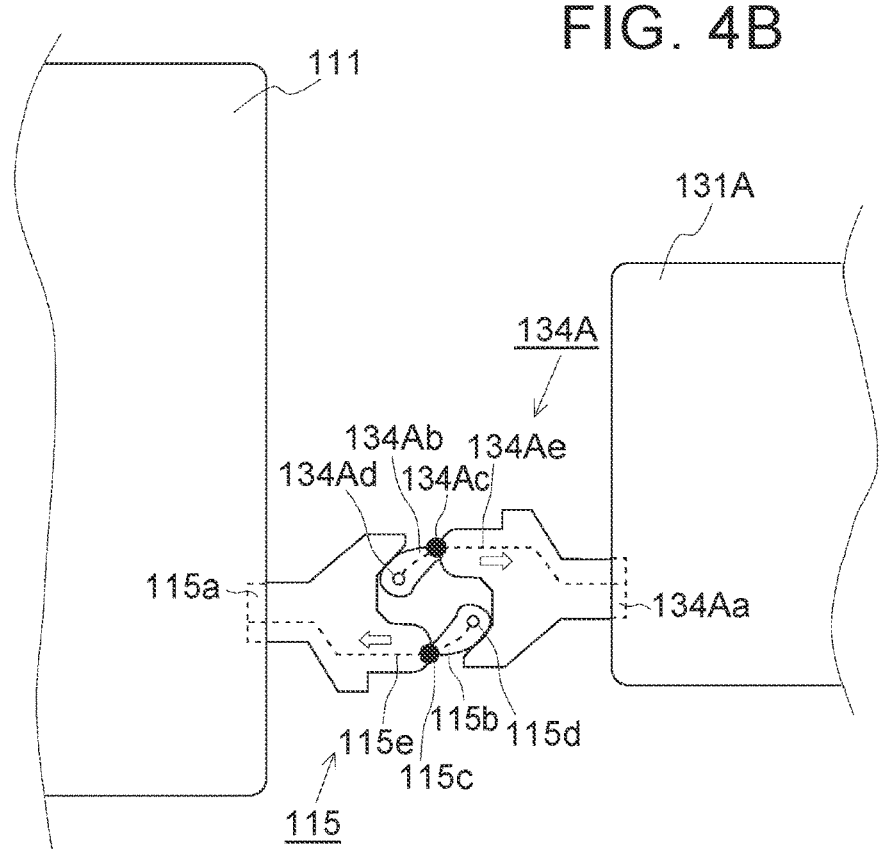
FIG. 4B is a third diagram for explaining a mode of separating the carrying unit from the front end unit.

When the wire 115e is drawn into the vehicle body 111, the knuckle 115b pivots to press the coupling hook 134A. Similarly, when the wire 134Ae is drawn into the container 131A, the knuckle 134Ab pivots to press the coupling hook 115. The base 115a is accordingly pushed into the vehicle body III as well as the base 134Aa is pushed into the container 131A as illustrated in FIG. 4B. Thus, the coupling between the front end unit 110 and the carrying unit 130A is released.

Figure 4C:
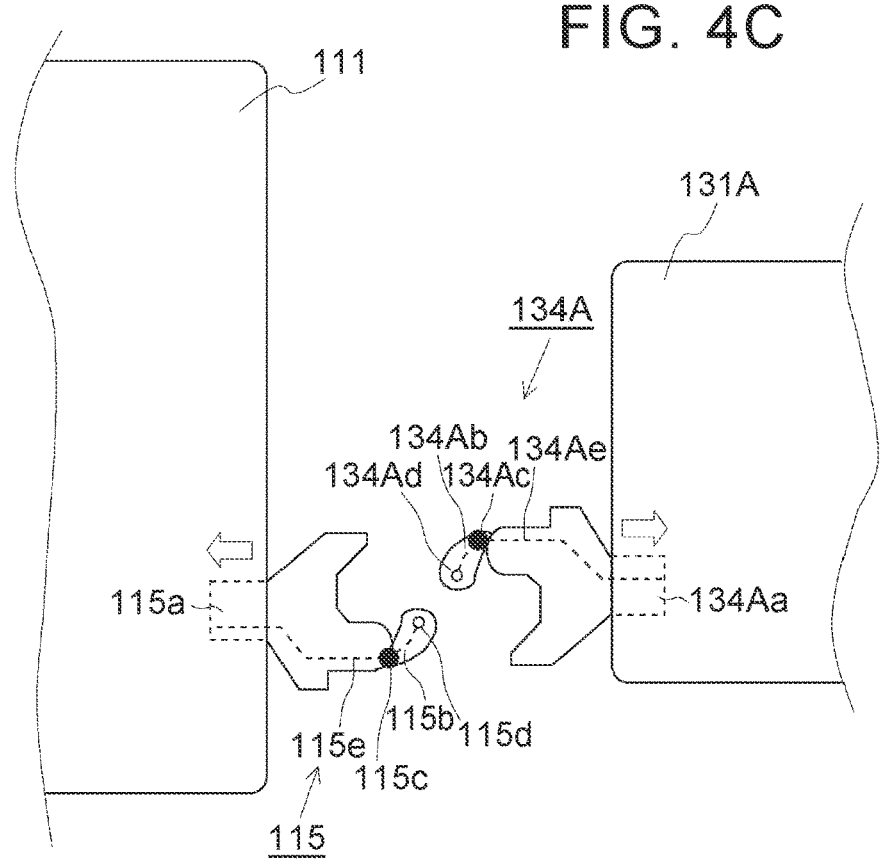
FIG. 4C is a fourth diagram for explaining the mode of separating the carrying unit from the front end unit.

Once the bases 115a and 134Aa are pushed into the vehicle body 111 and the container 131A to a degree illustrated in FIG. 4C, the carrying unit 130A can be separated in the direction intersecting the direction in which the vehicle 100 travels (lateral direction, vertical direction, etc.).

Operation of Autonomous Vehicle

The vehicle 100 described above is a vehicle that performs autonomous driving based on given commands. The commands are issued by a server. The server issues prescribed operation commands to the vehicles 100 to manage the vehicles 100.

In the first embodiment, the front end unit 110 and the rear end unit 120 perform autonomous driving based on the prescribed operation commands so that vehicle 100 travels autonomously. The vehicle that performs autonomous driving based on the prescribed operation commands (autonomous vehicle) will be detailed here. The front end unit 110 and the rear end unit 120 in the first embodiment can be coupled to each other via the carrying units to form the vehicle 100 as well as individually function as the autonomous vehicles described below.

Examples of application of the autonomous vehicle include a shuttle car that travels along a prescribed route, an on-demand taxi that is offered in response to a request from a user, a mobile shop that operates at a desired destination, and so forth. When the autonomous vehicle is intended for transporting passengers and cargo, the autonomous vehicle can transport passengers and cargo while traveling along a prescribed route. When the autonomous vehicle is intended for moving shops, facilities, or equipment, the autonomous vehicle travels to a destination and then the facility can be set up to start operation. The autonomous vehicle may be a vehicle that patrols the roads for monitoring facilities or infrastructures, or for crime prevention etc. In this case, the autonomous vehicle may travel along a prescribed patrol route. The autonomous vehicle is also referred to as an electric vehicle (EV) palette. The autonomous vehicle does not necessarily have to be an unmanned vehicle. For example, sales staff, customer service staff, security staff may ride on the autonomous vehicle. The autonomous vehicle does not necessarily have to be able to perform completely autonomous driving. For example, the autonomous vehicle may be such a vehicle that a person drives or assists in driving depending on the situation.

The autonomous vehicle has a function of receiving a request from a user, reacting to the user, executing prescribed processing in response to the request from the user, and reporting the processing result to the user. If there is any request, among the requests from the user, that can not be dealt with by the autonomous vehicle alone, the request may be transferred to a server and dealt with by the autonomous vehicle and the server in cooperation with each other.

The server is a device that issues commands for operation to the autonomous vehicle. For example, when the autonomous vehicle is an on-demand taxi, the server receives a request from a user and obtains a point to pick up and a destination. Then, the server sends an operation command to "transport passengers from a point of departure to a destination" to the autonomous vehicle traveling near the point of departure. This enables the autonomous vehicle to travel along the prescribed route. The operation command is not limited to a command to travel between the point of departure and the destination. For example, the operation command may be a command to "travel to the prescribed point to open the shop" or "travel along the prescribed route to patrol the streets". Thus, the operation command may include a command for an operation to be performed by the autonomous vehicle other than traveling.

Figure 5:
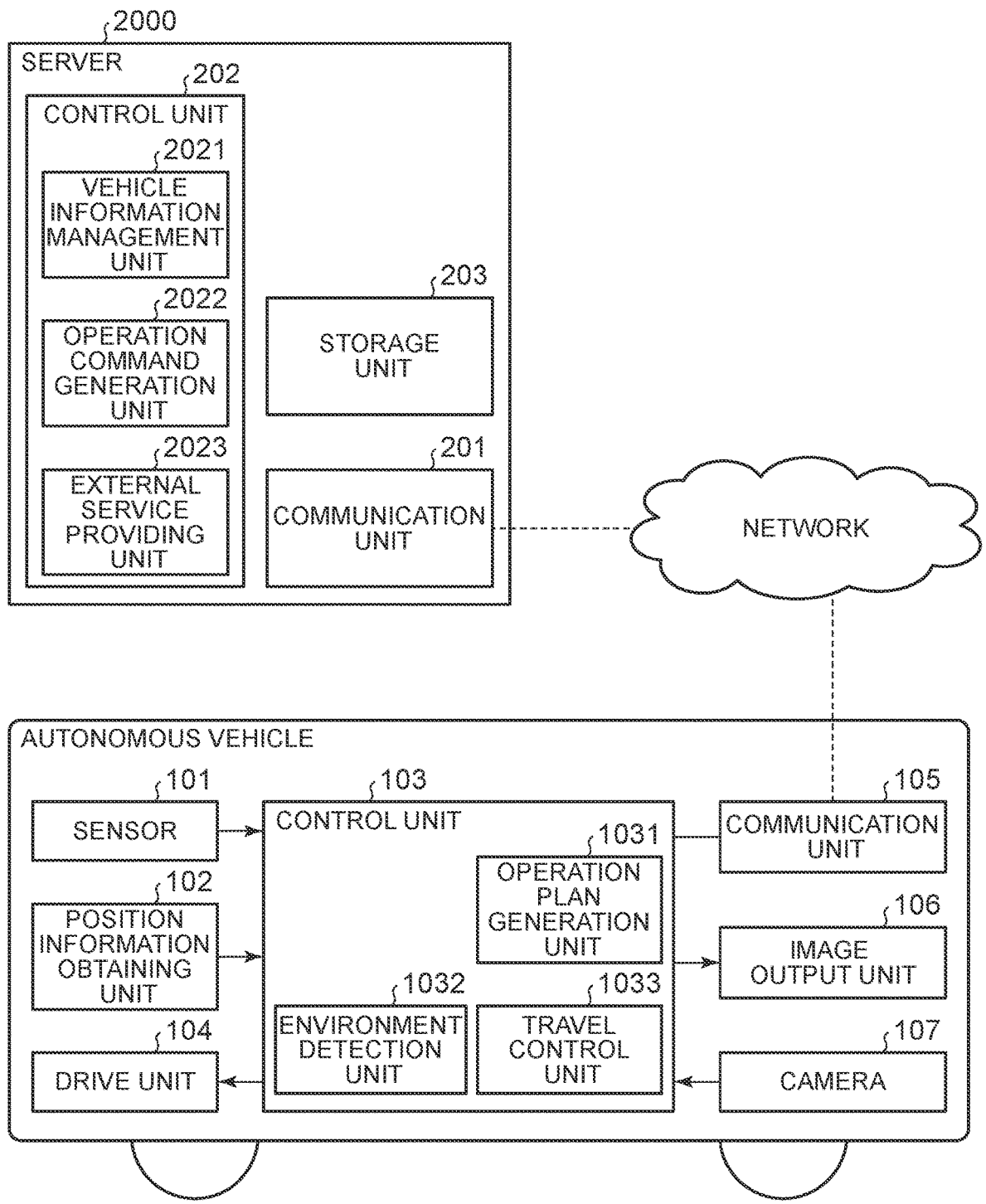
FIG. 5 is a block diagram schematically illustrating an example configuration of an autonomous vehicle and a server.

FIG. 5 is a block diagram schematically illustrating an example configuration of the autonomous vehicle and a server 2000. The configuration may include a plurality of autonomous vehicles.

The autonomous vehicle travels based on the operation command obtained from the server 2000. Specifically, the autonomous vehicle generates a travel route based on the operation command obtained through wireless communications, and appropriately travels on the road while sensing the surroundings.

The autonomous vehicle includes a sensor 101, a position information obtaining unit 102, a control unit 103, a drive unit 104, a communication unit 105, an image output unit 106. The autonomous vehicle operates on electric power supplied from a battery (not shown).

The sensor 101 is a device that senses the surroundings of the autonomous vehicle, and typically includes a stereo camera, a laser scanner, a light detection and ranging (LI-DAR), a radar and the like. Information obtained by the sensor 101 is transmitted to the control unit 103. The position information obtaining unit 102 is a device that obtains a current location of the autonomous vehicle and typically includes a GPS receiver and the like. Information obtained by the position information obtaining unit 102 is transmitted to the control unit 103.

The control unit 103 is a computer that controls the autonomous vehicle based on the information obtained from the sensor 101. The control unit 103 is a microcomputer, for example.

The control unit 103 has an operation plan generation unit 1031, an environment detection unit 1032, and a travel control unit 1033 as functional modules. The functional modules may be implemented by execution of programs by a central processing unit (CPU) not shown. The programs are stored in a storage device such as a read-only memory (ROM) not shown.

The operation plan generation unit 1031 obtains the operation command from the server 2000 to generate an operation plan for the autonomous vehicle. In the first embodiment, the operation plan represents data indicating a travel route of the autonomous vehicle and operations to be performed by the autonomous vehicle on part of or the entirety of the travel route. Examples of the data included in the operation plan include the following.

(1) Data Indicating the Travel Route of the Autonomous Vehicle with a Set of Road Links The travel route of the autonomous vehicle may be automatically generated based on a given point of departure and a given destination, with reference to map data stored in a storage device (not illustrated), for example. An external service may be used to generate the data.

(2) Data Indicating the Operation to be Performed by the Autonomous Vehicle on a Point of the Route The operation to be performed by the autonomous vehicle includes, but is not limited to, "pick-up/discharge of passengers", "loading/unloading of cargo", "opening/closing of mobile shops", "collection of data", and "output of images (using an external display described later)". The operation plan generated by the operation plan generation unit 1031 is transmitted to the travel control unit 1033 described later.

The environment detection unit 1032 detects the environment around the autonomous vehicle based on the data obtained by the sensor 101. Objects to be detected include, but are not limited to, the number and positions of lanes, the number and positions of vehicles around the autonomous vehicle, the number and positions of obstacles around the autonomous vehicle (pedestrians, bicycles, structures, buildings, etc.), the structure of a road, road signs, and the like. Any object necessary for autonomous driving may be detected. The environment detection unit 1032 may track the detected object. For example, a relative velocity of the detected object may be determined based on a difference between coordinates of the object detected in a previous step and coordinates of the object currently detected. Data on the environment, which is detected by the environment detection unit 1032 (hereinafter referred to as environment data) is transmitted to the travel control unit 1033.

The travel control unit 1033 controls the travel of the autonomous vehicle based on the operation plan generated by the operation plan generation unit 1031, the environment data generated by the environment detection unit 1032, and the position information of the autonomous vehicle obtained by the position information obtaining unit 102. For example, the travel control unit 1033 performs the control such that the autonomous vehicle travels along the prescribed route without allowing obstacles to enter a prescribed safety zone around the autonomous vehicle. Known methods can be used as the method of enabling autonomous driving of a vehicle.

The drive unit 104 is a device that causes the autonomous vehicle to travel based on the command issued by the travel control unit 1033. The drive unit 104 includes a motor and an inverter for driving vehicle wheels, a brake system, a steering mechanism, a secondary battery, and so forth. The communication unit 105 is a communication device that is used for connecting the autonomous vehicle to the network.

In the first embodiment, the communication unit 105 can communicate with another apparatus (for example, the server 2000) via the network, using a mobile communication service such as 3G (third generation) and LTE (Long Term Evolution). The communication unit 105 may have another communication device used for inter-vehicle communications between the autonomous vehicle and another autonomous vehicle.

The image output unit 106 is a device that outputs an image on the external display provided on the vehicle body. The autonomous vehicle can output an image on the external display. The external display may be a liquid crystal display or may include an LED matrix etc. The image output unit 106 can generate or obtain an image and output the image on the external display based on the data included in the operation plan.

The camera 107 is provided on the vehicle body of the autonomous vehicle. The camera 107 is a picture-taking device including a charge-coupled device (CCD), a metal-oxide semiconductor (MOS), a complementary metal-oxide semiconductor (CMOS) or the like. The autonomous vehicle can obtain an image (still image or moving image) using the camera 107 mounted thereon.

Next, the server 2000 will be described. The server 2000 is a device that manages traveling positions of the plurality of autonomous vehicles and transmits operation commands. When receiving a request for dispatch of a taxi from a user, for example, the server 2000 obtains a point of departure and a destination, and then transmits an operation command to an autonomous vehicle that travels around the point of departure (that can function as a taxi).

The server 2000 includes a communication unit 201, a control unit 202, and a storage unit 203. The communication unit 201 is a communication interface for communications with the autonomous vehicle via the network, similar to the communication unit 105.

The control unit 202 is a device that controls the server 2000. The control unit 202 is a CPU, for example. The control unit 202 has a vehicle information management unit 2021, an operation command generation unit 2022, and an external service providing unit 2023 as functional modules. The functional modules may be implemented by execution of programs by a CPU (not shown). The programs are stored in a storage device such as a ROM (not shown).

The vehicle information management unit 2021 manages the autonomous vehicles under the server 2000. Specifically, the vehicle information management unit 2021 receives position information from the plurality of autonomous vehicles at prescribed intervals, associates the position information with the date and time, and stores the position information in the storage unit 203 described later. The vehicle information management unit 2021 retains and updates data on characteristics of each autonomous vehicle (vehicle information) as required. The vehicle information may be information on the autonomous vehicle such as its identifier, use, type, standby point (parking lot, office), door type, body size, loading capacity, maximum number of occupants to ride, cruising range after full charge, current cruising range, and current status (vacant, occupied, traveling, in service, etc.), for example, but is not limited thereto.

When receiving a request for dispatch of an autonomous vehicle from outside, the operation command generation unit 2022 selects an autonomous vehicle to dispatch and issues an operation command in accordance with the request. The request for dispatch of an autonomous vehicle includes the following, but is not limited thereto.

(1) Request for Transport of Passengers and Cargo

This request is for transport of passengers and cargo with a point of departure and a destination or a route specified.

(2) Request for Dispatch of an Autonomous Vehicle Having a Specific Function

This request is for dispatch of an autonomous vehicle having a function of a shop (restaurant, store, showcase, etc.), a business base (private office, sales office, etc.), public facilities (service counters of the City Hall, libraries, medical facilities, etc.), and the like. The autonomous vehicle may be dispatched to a single location or may be dispatched to a plurality of locations. When the autonomous vehicle is dispatched to the plurality of locations, the autonomous vehicle may provide a service at each of the locations.

(3) Request for Patrol of Roads

This request is for patrol of roads for monitoring of facilities and infrastructures, for crime prevention, and the like.

The request for dispatch of the autonomous vehicle is obtained from the user via the network, for example. The request for dispatch does not necessarily have to be sent from a general user, for example, the request may be sent from a company that operates autonomous vehicles. The autonomous vehicle to which the operation command is sent is determined based on the position information and the vehicle information (function of the vehicle) etc. of each of the autonomous vehicles, which is obtained by the vehicle information management unit 2021.

The storage unit 203 is a device that stores information, and is a random access memory (RAM), a magnetic disc, a flash memory, or the like.

Mode of Collecting Cargo

Figure 6:
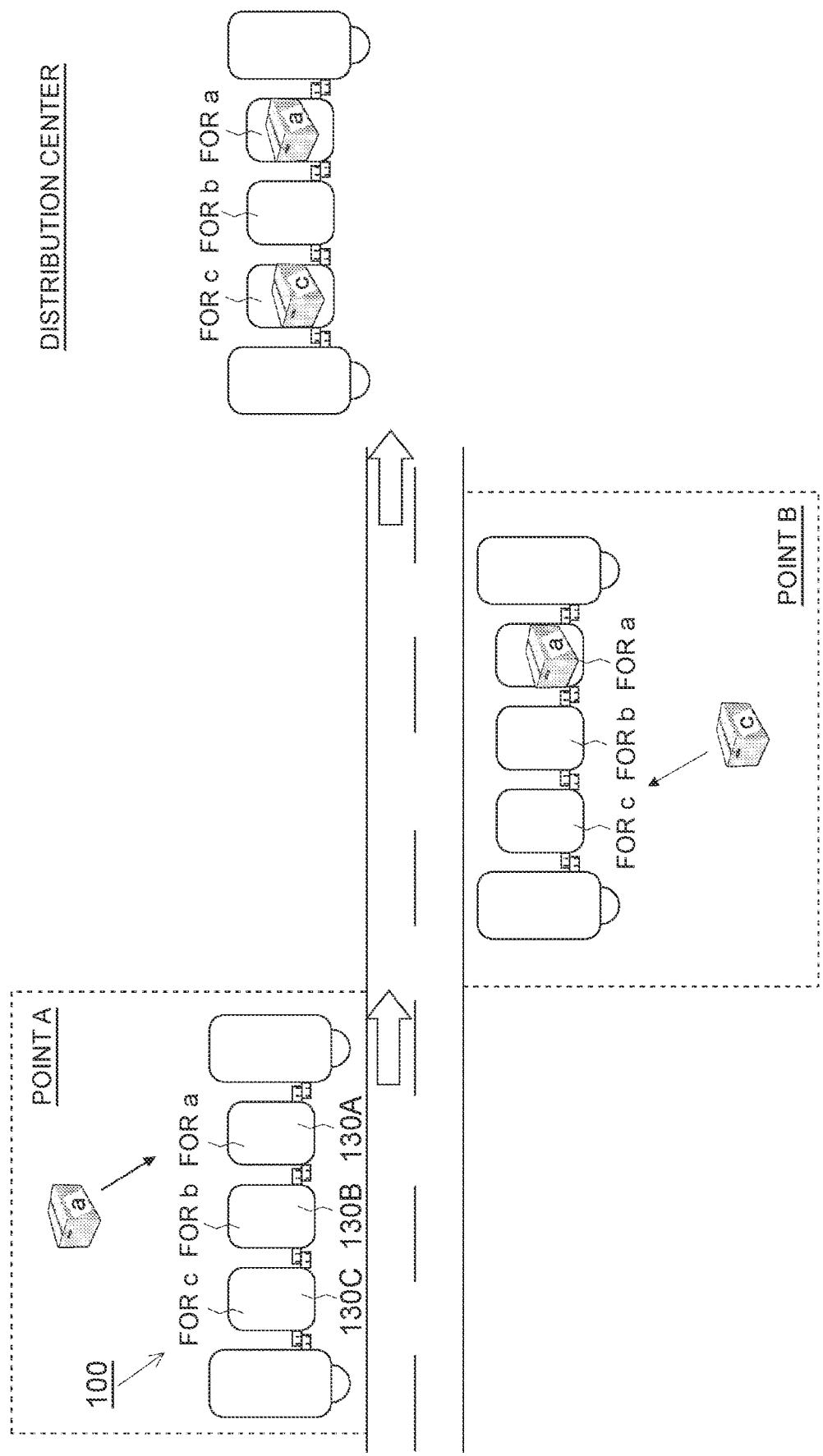
FIG. 6 is a diagram for explaining a mode of collecting cargo using the vehicle according to the first embodiment.

FIG. 6 is a diagram for explaining a mode of collecting cargo using the vehicle 100 according to the first embodiment. In the example illustrated in FIG. 6, the vehicle 100 has the carrying units 130A, 130B, and 130C. A destination of the cargo loaded on each of the carrying units 130A, 130B, and 130C is determined in advance. The vehicle 100 is loaded with cargo at a point A and a point B, and then, heads for the distribution center.

As illustrated in FIG. 6, the cargo loaded at the point A is bound for an area a. Therefore, at the point A, the cargo is loaded onto the carrying unit 130A bound for the area a. The cargo loaded at the point B is bound for an area c. Therefore, at the point B, the cargo is loaded onto the carrying unit 130C bound for the area c.

Mode of Sorting Cargo

Figure 7:
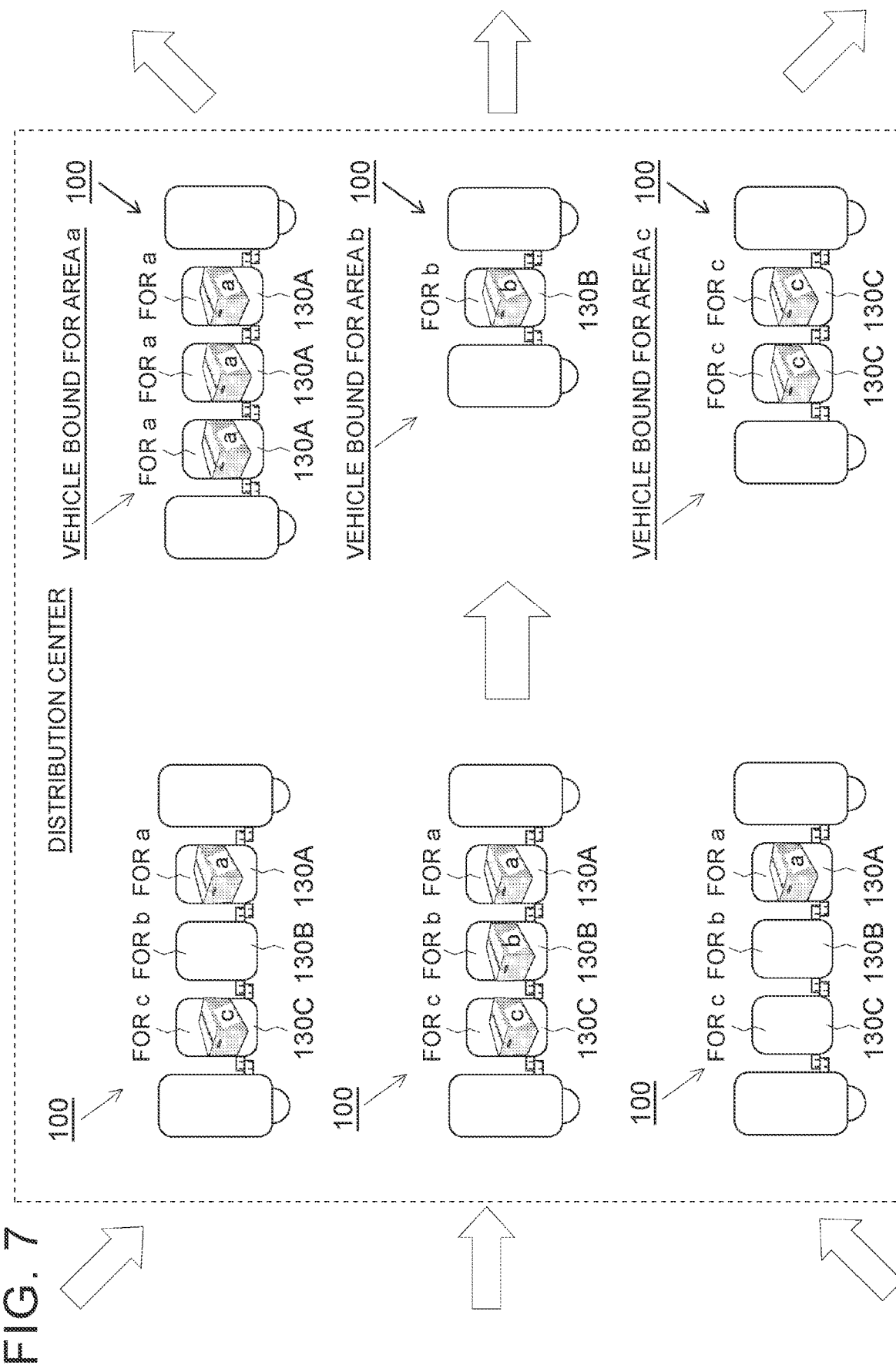
FIG. 7 is a diagram for explaining a mode of sorting the cargo according to the first embodiment.

FIG. 7 is a diagram for explaining a mode of sorting cargo according to the first embodiment. In the example illustrated in FIG. 7, the vehicles 100 that have collected the cargo as described with reference to FIG. 6 are gathered at the distribution center. Then, the cargo is unloaded and reloaded at the distribution center. Specifically, multiple items of cargo bound for the same area are gathered to be loaded onto the same vehicle 100.

In the first embodiment, it is possible to load the multiple items of cargo bound for the same area onto the same vehicle 100 only by exchanging the carrying units. As illustrated in FIG. 7, the vehicles 100 that have collected the cargo and have been gathered at the distribution center each have the carrying units 130A, 130B, and 130C bound for the area a, an area b, and the area c, respectively. That is, the vehicles 100 are each loaded with the cargo to be delivered to different areas. Therefore, the vehicles 100 are each temporarily disassembled by separating the carrying units.

As described above, the carrying units can be separated from the vehicle 100 in the direction intersecting the direction in which the vehicle 100 travels, while the front end unit 110 and the rear end unit 120 are stationary. Therefore, the vehicle 100 can be disassembled relatively easily. At the distribution center, the carrying units bound for the same area are gathered and coupled to the vehicle 100. Specifically, the vehicle 100 that delivers the cargo to the area a is reassembled as the carrying units 130A bound for the area a are coupled thereto as illustrated in FIG. 7. Similarly, the vehicle 100 that delivers the cargo to the area b is reassembled as the carrying units 130B bound for the area b are coupled thereto, and the vehicle 100 that delivers the cargo to the area c is reassembled as the carrying units 130C bound for the area c are coupled thereto. As described above, the vehicle 100 can be reassembled relatively easily.

As described above, the carrying units are easily exchanged so that the cargo can be unloaded and reloaded easily according to the first embodiment. Furthermore, the multiple items of cargo bound for the same area can be easily gathered.

Second Embodiment

Figure 8:
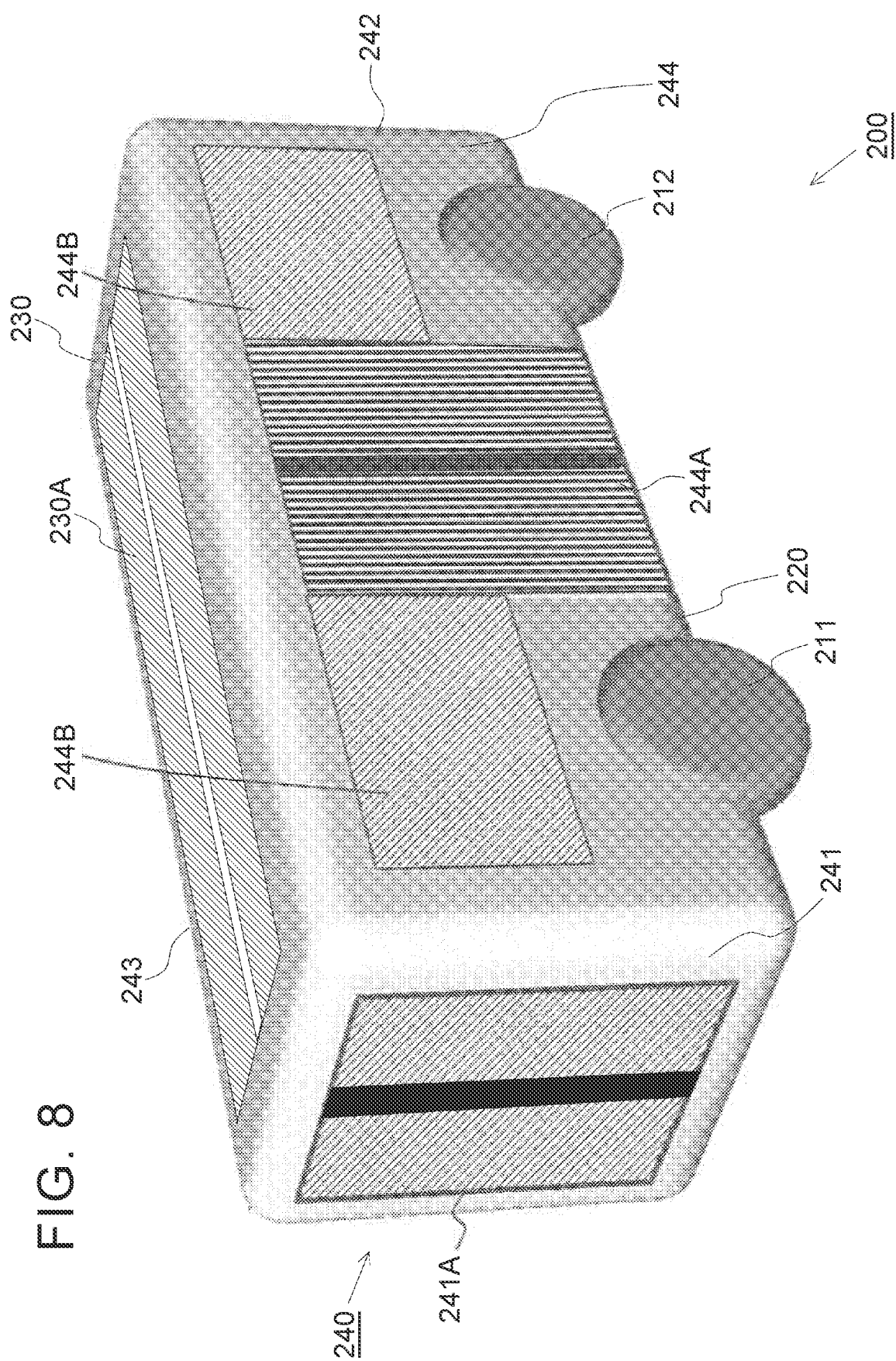
FIG. 8 is a schematic view of a vehicle according to a second embodiment.
Figure 9A:
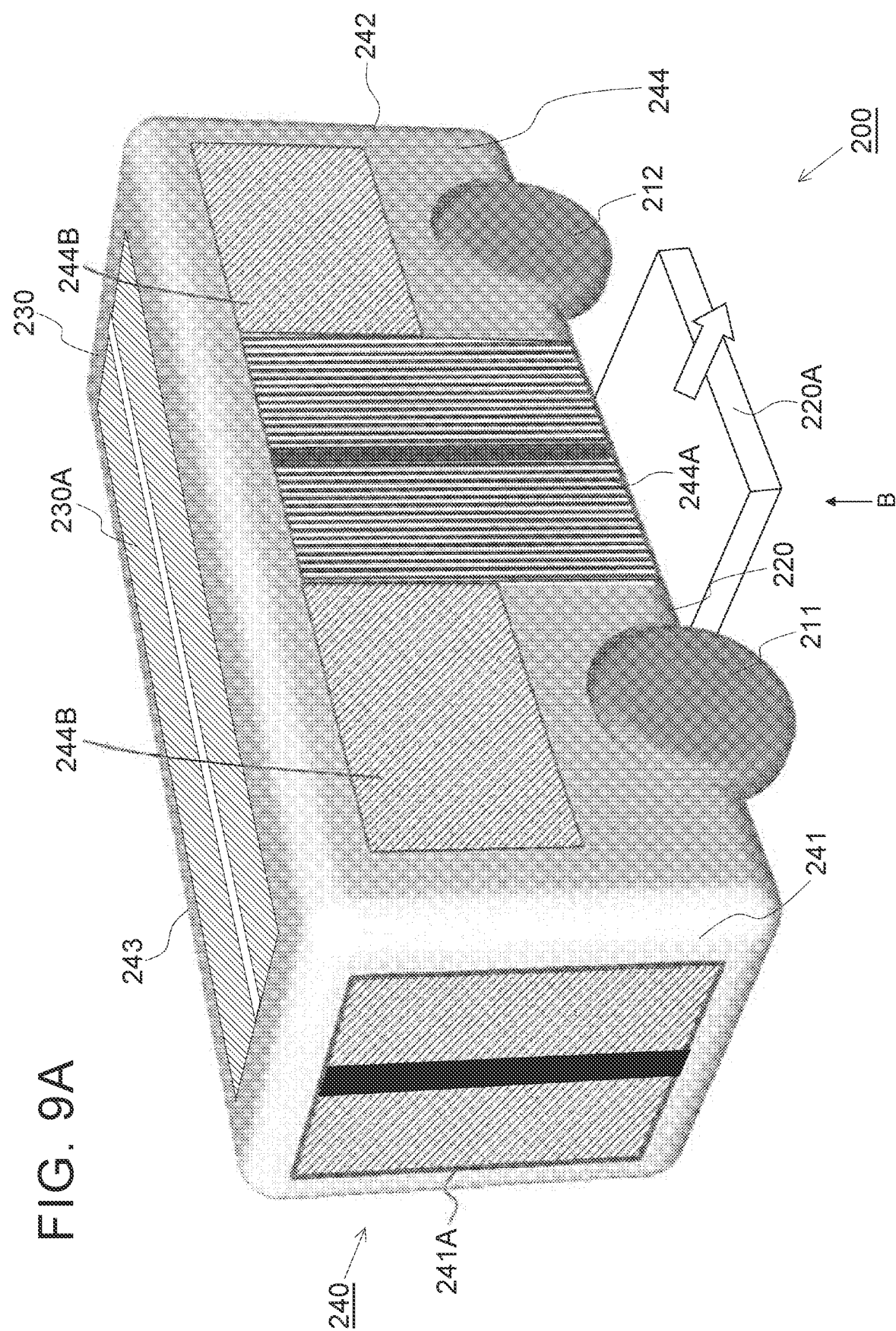
FIG. 9A is a first diagram schematically illustrating a sliding door according to the second embodiment.
Figure 9B:
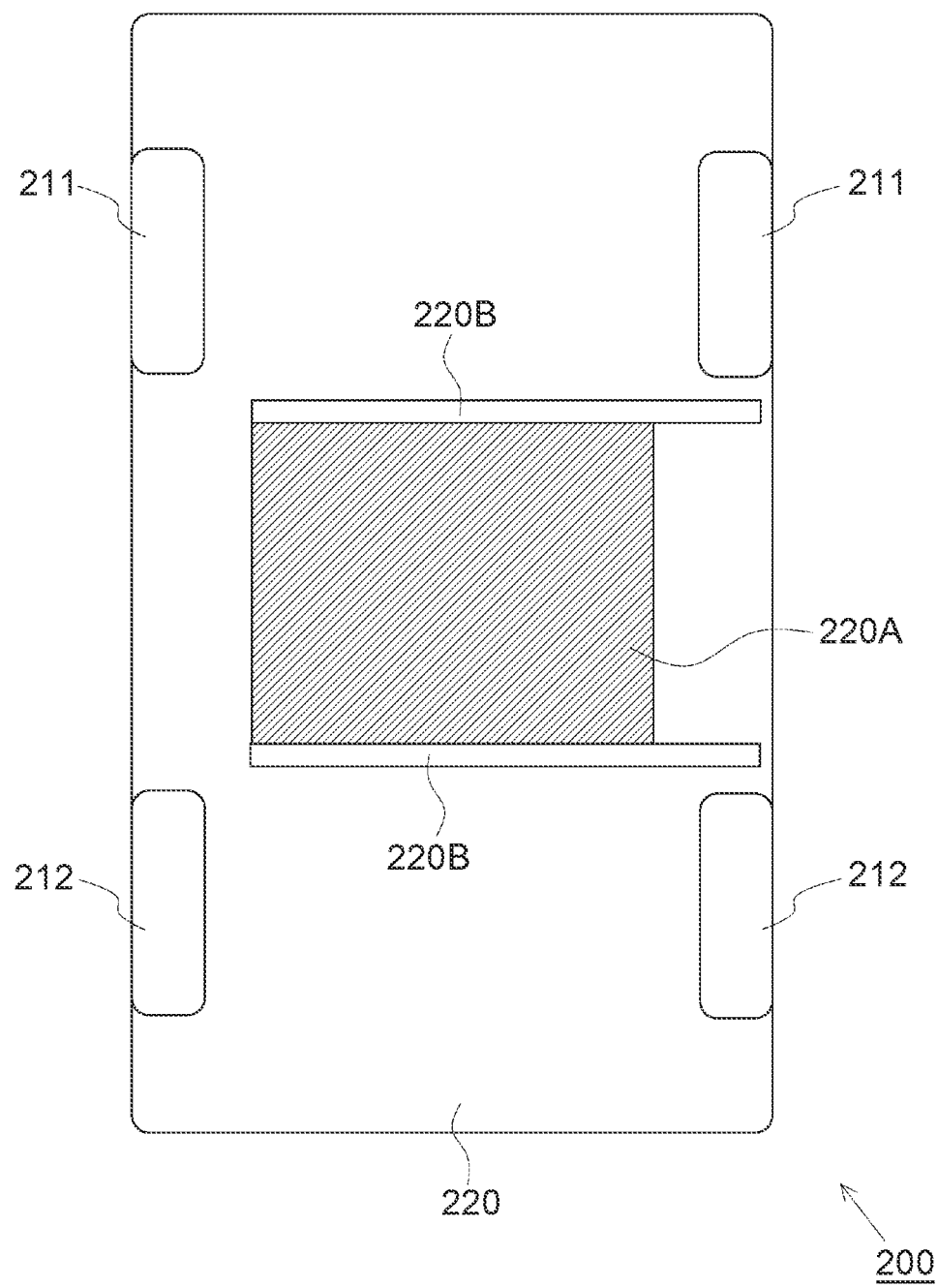
FIG. 9B is a view along an arrow B in FIG. 9A.
Figure 9C:
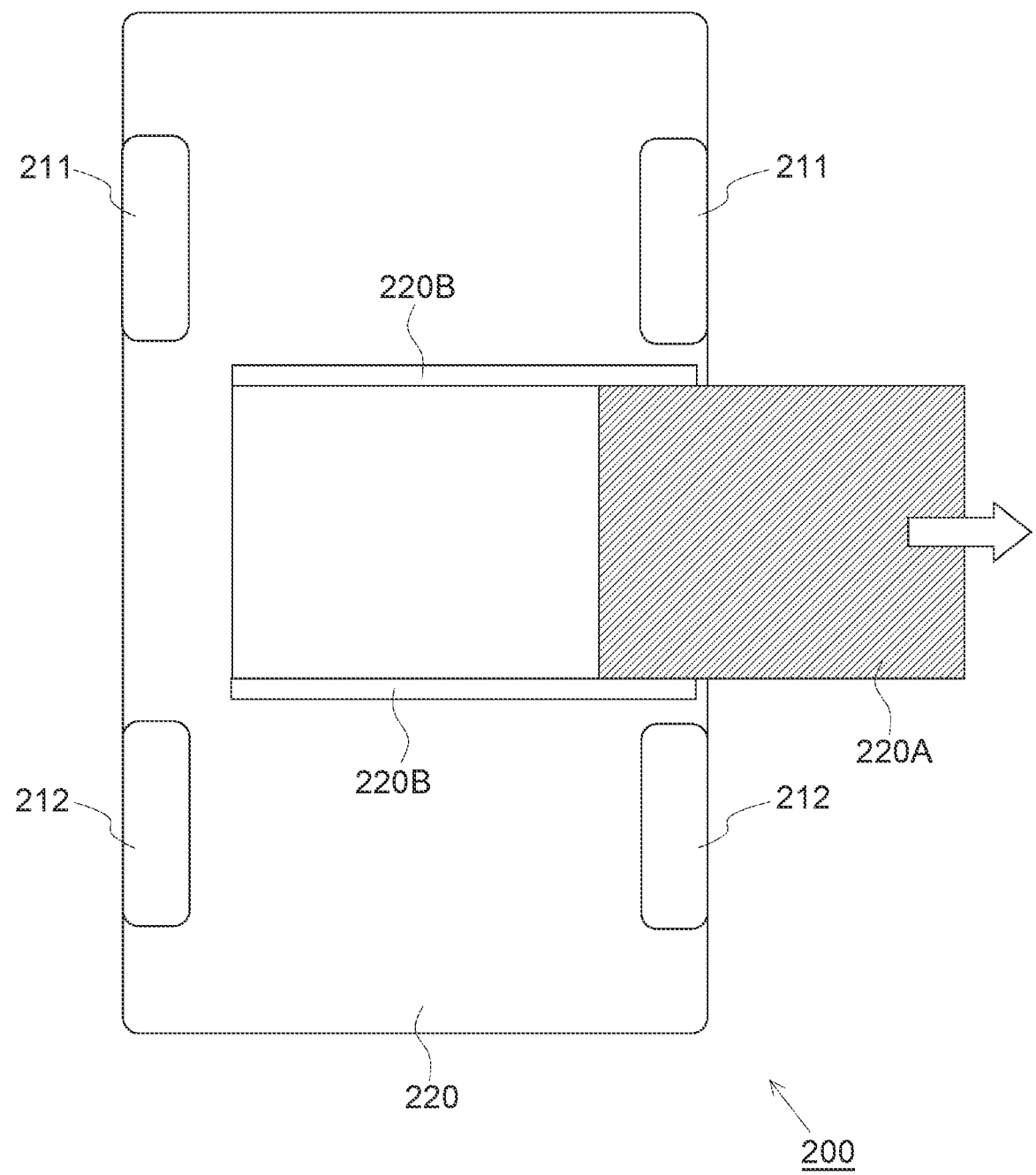
FIG. 9C is a diagram for explaining operation of the sliding door illustrated in FIG. 9A.
Figure 10:
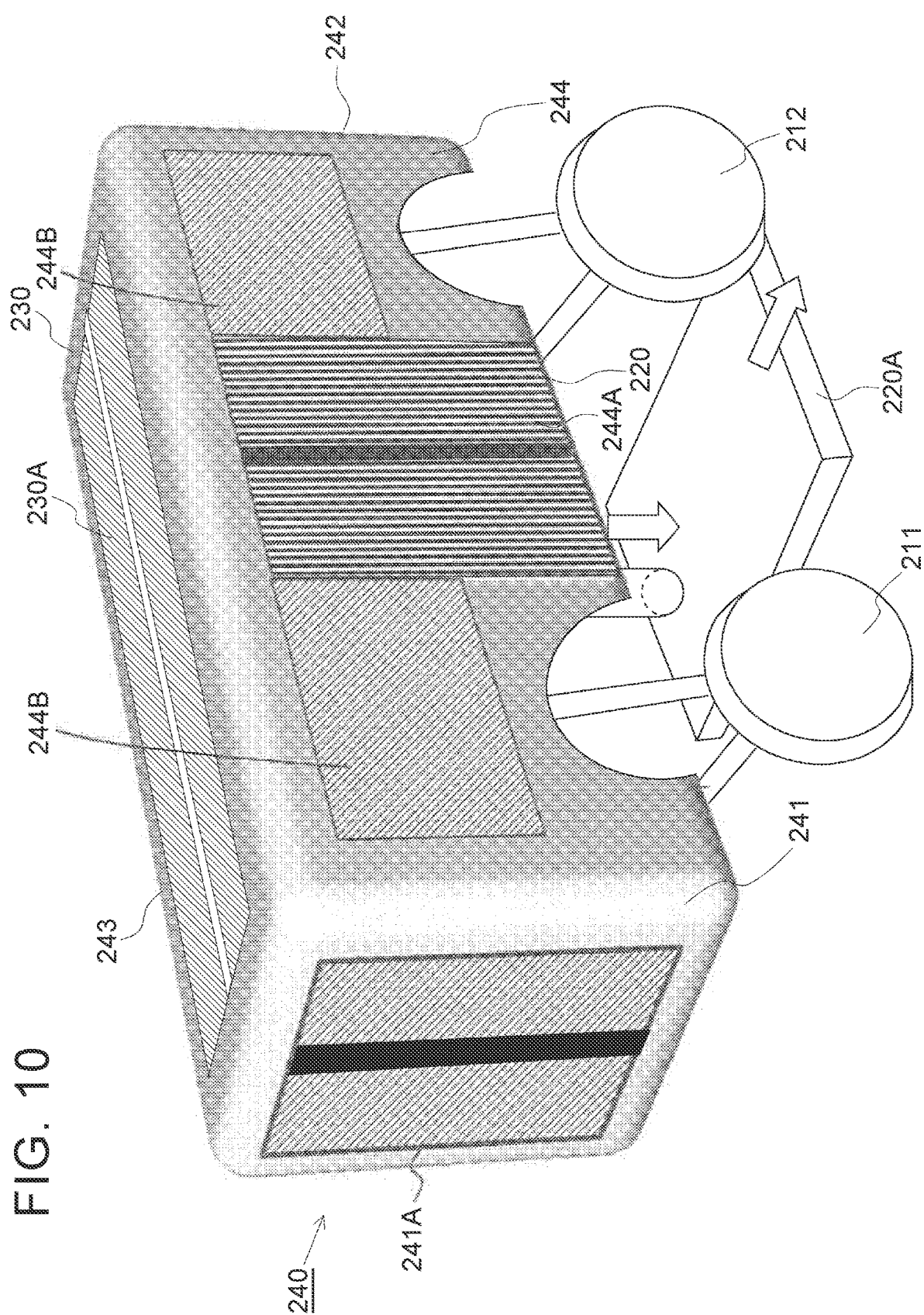
FIG. 10 is a second diagram schematically illustrating the sliding door according to the second embodiment.

An outline of a vehicle according to a second embodiment will be described with reference to FIGS. 8 to 10. A vehicle 200 according to the second embodiment has a floor 220 provided with front wheels 211 and rear wheels 212, a roof 230 provided so as to face the floor 220, and side walls 240 provided between the floor 220 and the roof 230, as illustrated in FIG. 8. The side walls 240 include a front wall 241, a rear wall 242, a right wall 243, and a left wall 244. Cargo is loaded into a space defined by the floor 220, the roof 230, the front wall 241, the rear wall 242, the right wall 243, and the left wall 244.

In the second embodiment, all of the floor 220, the roof 230, and the side walls 240 are provided with opening/closing portions that allow access to the cargo on the vehicle 200. Specifically, the roof 230, the front wall 241, the rear wall 242, the right wall 243, and the left wall 244 are provided with opening/closing doors 230A, 241A, 242A, 243A, and 244A, respectively, that allow access to the cargo. The right wall 243 and the left wall 244 are further provided with opening/closing windows 243B and 244B, respectively.

The floor 220 is provided with a sliding door 220A. The sliding door 220A slides substantially in parallel with the floor 220 so as to partially open and close the floor 220. The sliding door 220A according to the second embodiment is slidable toward the left wall 244 side as illustrated in FIG. 9A. Specifically, as illustrated in FIG. 9B that is a view along arrow B in FIG. 9A, the sliding door 220A is mounted on the underside of the floor 220 via rails 220B provided on the underside of the floor 220. When the sliding door 220A slides along the rails 220B, the floor 220 is partially opened as illustrated in FIG. 9C.

The vehicle 200 is an autonomous vehicle that performs autonomous driving based on given commands. The operation of the autonomous vehicle is as described above in the first embodiment.

When the cargo is delivered using the vehicles 200, the cargo can be unloaded and reloaded easily at the distribution center. In the vehicle 200, it is possible to access the cargo through any of the floor 220, the roof 230, and the side walls 240 that define the space into which the cargo is loaded. Thus, the cargo that is difficult to take out from one side can be taken out from another side, which facilitates unloading and reloading of the cargo.

In order to facilitate access to the cargo from the floor 220 side of the vehicle 200, the vehicle 200 may be configured such that the space into which the cargo is loaded (space defined by the floor 220, the roof 230 and the side walls 240) is movable upward relative to the vehicle wheels (front wheels 211, rear wheels 212), that is, the height of the vehicle 200 can be made higher. The sliding door 220A may be opened and closed as described above, with the height of the vehicle 200 being kept high. The sliding door 220A may be configured to be slid to the left wall 244 side after being temporarily moved downward as illustrated in FIG. 10.

What is claimed is:

1. A vehicle for transporting cargo, comprising:
a front end unit having a front wheel;
a rear end unit having a rear wheel; and
a carrying unit, on which the cargo is loaded and which is interposed between the front end unit and the rear end unit so that the front end unit and the rear end unit are coupled to each other via the carrying unit, the carrying unit configured to be separated from the front end unit and the rear end unit in a direction intersecting a direction in which the vehicle travels and to be coupled to the front end unit and the rear end unit while the front end unit and the rear end unit are stationary.

2. The vehicle according to claim 1, wherein the vehicle includes a plurality of the carrying units, the carrying units configured to be separated from each other in the direction intersecting the direction in which the vehicle travels and to be coupled to each other while the front end unit and the rear end unit are stationary.

3. The vehicle according to claim 1, wherein the vehicle is an autonomous mobile body that autonomously moves based on a prescribed operation command.

4. The vehicle according to claim 1, wherein the front end unit includes a front end body and a front end coupling portion stowable within the front end body, and the rear end unit includes a rear end body and a rear end coupling portion stowable within the rear end body.

5. The vehicle according to claim 1, wherein the carrying unit includes a carrying unit body and a carrying unit coupling portion stowable within the carrying unit body.

* * * * *